US007225515B1

(12) United States Patent
Hicks

(10) Patent No.: US 7,225,515 B1
(45) Date of Patent: Jun. 5, 2007

(54) STEEL JOINING TOOL

(76) Inventor: Larry Truett Hicks, 605 Spring Lake Dr., Bedford, TX (US) 76021

( * ) Notice: Subject to any disclaimer, the term of this patent is extended or adjusted under 35 U.S.C. 154(b) by 283 days.

(21) Appl. No.: 11/048,527

(22) Filed: Feb. 1, 2005

Related U.S. Application Data

(60) Provisional application No. 60/543,349, filed on Feb. 10, 2004.

(51) Int. Cl.
*B23P 19/04* (2006.01)

(52) U.S. Cl. ........................... 29/267; 29/278; 254/131

(58) Field of Classification Search .................. 29/267, 29/255, 278, 275; 254/25, 21
See application file for complete search history.

(56) References Cited

U.S. PATENT DOCUMENTS

| | | | | |
|---|---|---|---|---|
| 882,449 | A * | 3/1908 | Bradshaw | 254/22 |
| D42,279 | S * | 3/1912 | Gillet | 254/25 |
| 3,700,212 | A * | 10/1972 | Morgenberger | 254/131 |
| 5,265,661 | A * | 11/1993 | Tran | 157/1.3 |
| 6,202,985 | B1 * | 3/2001 | Chong et al. | 254/131 |
| 2006/0242811 | A1 * | 11/2006 | Hubbard | 29/267 |

* cited by examiner

*Primary Examiner*—Lee D. Wilson

(57) ABSTRACT

A new tool that connects horizontal bar to vertical bar and disconnects same. V-shaped cut or slots in tip locks in vertical bar opening at a desired angle. Wheel sets on horizontal bar and pushes down to lock into vertical bar. Set tool upside down on bottom of horizontal bar and lift to raise or disconnect horizontal bar from vertical bar.

4 Claims, 2 Drawing Sheets

STEEL JOINING TOOL

CROSS-REFERENCE TO RELATED APPLICATIONS

This application claims the benefit of provisional patent application Ser. No. 60-543,349, filed 2004 Feb. 10 by the present inventor. Disclosure document filed 2003 Dec. 18.

FEDERALLY SPONSORED RESEARCH

Not Applicable

SEQUENCE LISTING OR PROGRAM

Not Applicable

BACKGROUND OF THE INVENTION

1. Field of Invention

This invention relates generally to the field of manufacturing and process, specifically to steel shelving as used in storage facilities.

2. Prior Art

Warehouse employees for many years have had the unpleasant job of changing the horizontal beams that are used for storage of merchandise, to raise or lower height. The most used method is a sledge hammer or dead weight. Sometimes if they are very tight a fork lift is used resulting in damage to beams, noise and injury. After steel is loaded with pallets it is in more of a strain or bind making the process more difficult.

OBJECTS AND ADVANTAGES

Accordingly, several objects and advantages of the described invention are:

(a) to provide a tool that is safe;

(b) to provide a tool that is easy to use;

(c) to provide a tool that is faster and more efficient to use;

(d) to provide a tool that does not damage beams; and (e) to provide a tool that results in less noise.

Further objects and advantages of my steel joining tool will become apparent from consideration of drawings and ensuing descriptions.

SUMMARY

In accordance with a preferred embodiment of the invention, there is disclosed a tool for changing steel horizontal beams in warehouse situations. This tool is superior to present and past methods used.

A hand held device with an elongated body having a tip to connect to opening in vertical steel. Two legs at front of body support a wheel both near the front of tool. Handle allows user to apply pressure up or down to join or separate beams.

DETAILED DESCRIPTION—PREFERRED EMBODIMENT

An elongated body having a first end and a second end with tip extending from front end. One or more legs to support one or more wheels at front end close to tip. Body is steel 2.54 cm (1 inch), inside diameter pipe approximately 71.12 cm (28 inches) long. Legs are steel 3.81 cm by 6.35 cm (1½ by 2½ inches) are welded to body to support wheel approximately 2.54 cm (1 inch) behind where tip is connected to body. All measurements are approximate.

This description should not be constructed as limitations on the scope of invention but be considered my preferred embodiment. There are other variations for example folding leg, larger wheel, wider wheel, and adjustable supports.

DESCRIPTION OF DRAWINGS

1 elongated body or handle
2 steel core element
3 washers
4 leg supports
5 wheel
7 bolt
8 V-cut

FIG. 5 shows a washer.

FIG. 6 shows an alternative embodiment of the tool.

LOCATION OF FIGURES

Figure 1:
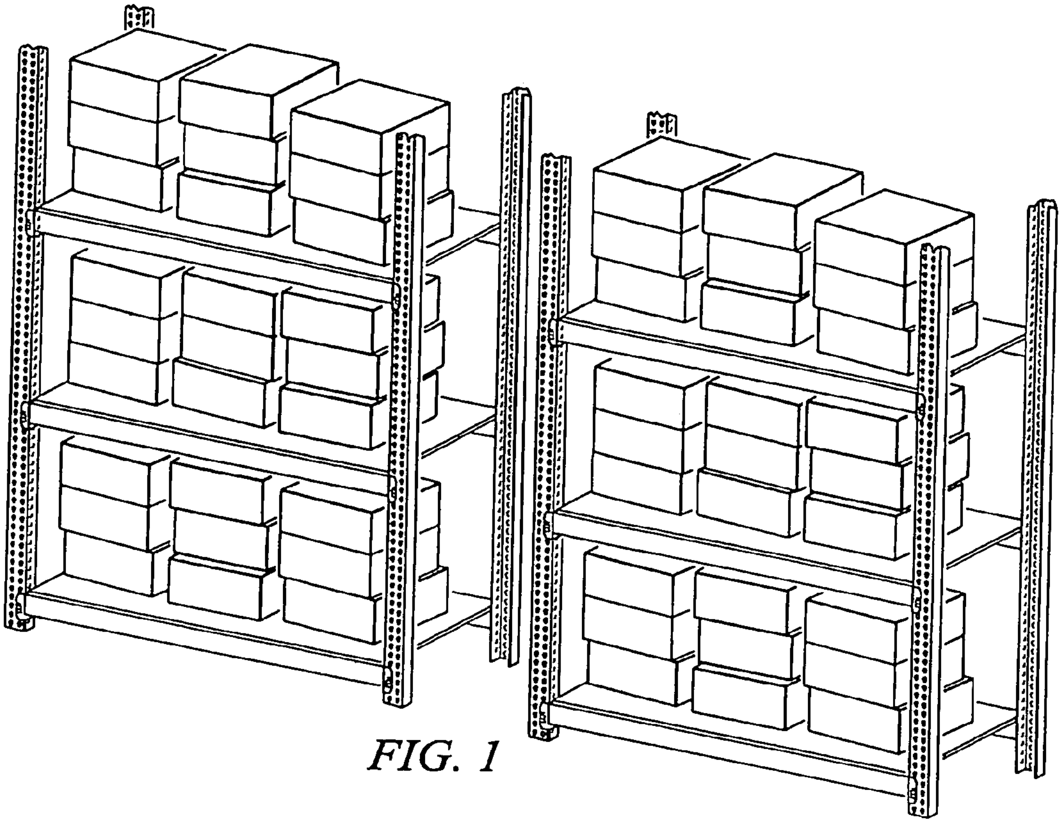
FIG. 1 shows view of steel shelf units used in industrial and retail warehouses.
Figure 2:
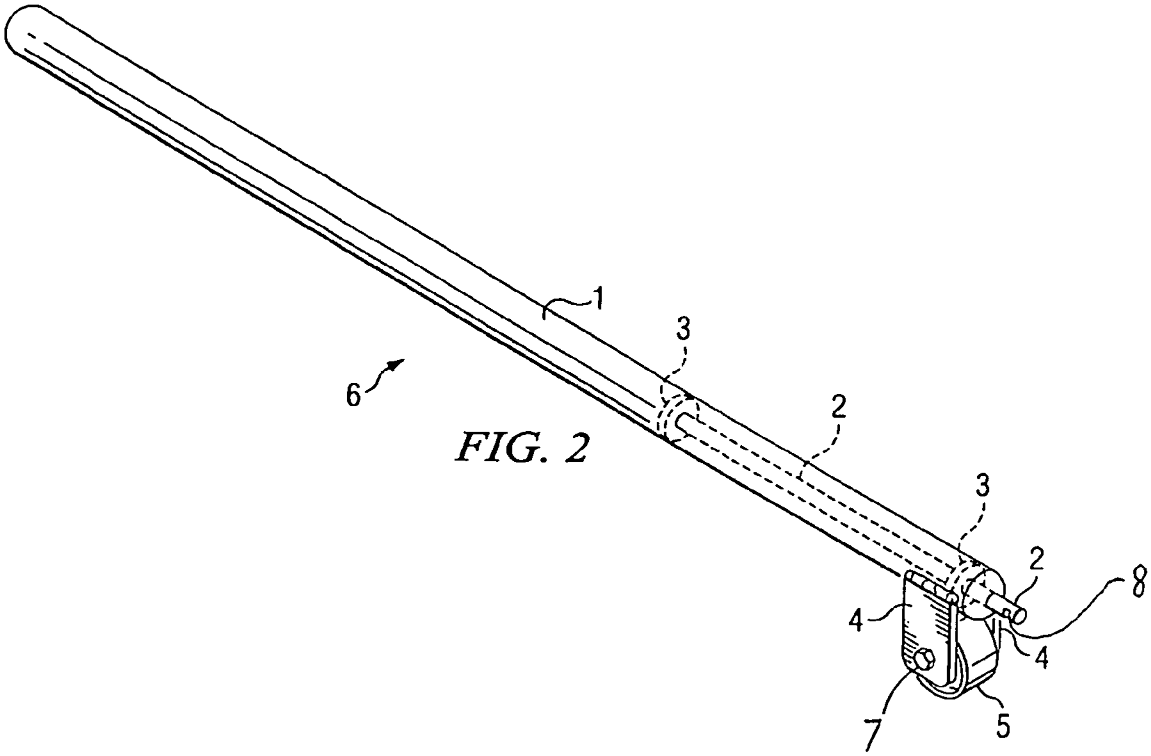
FIG. 2 shows view of completed tool.
Figure 3:
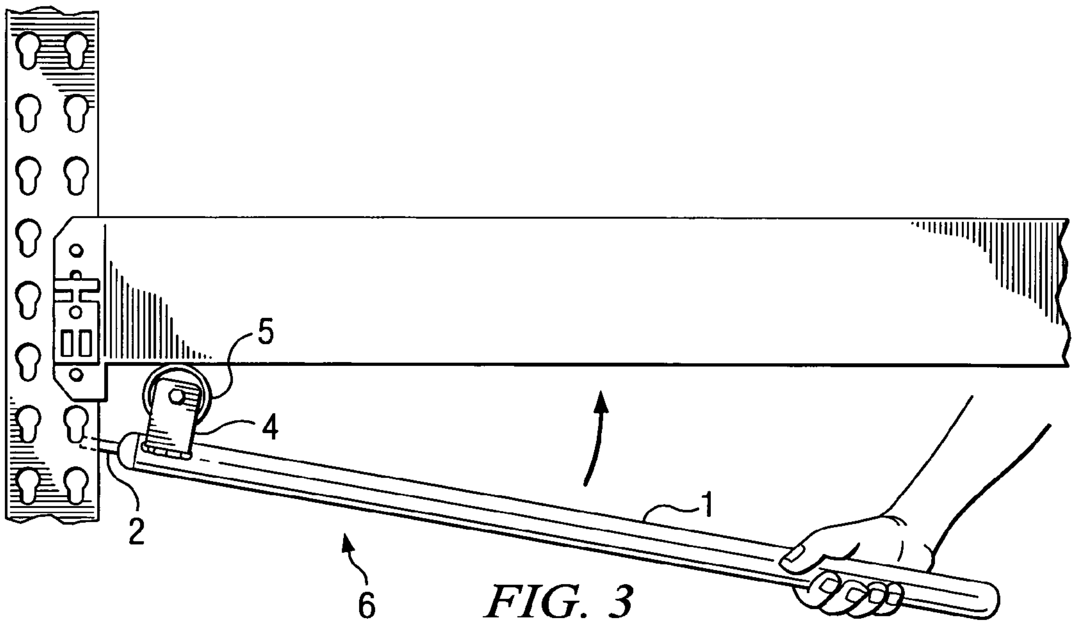
FIG. 3 shows tool in positions to lift or remove beam from vertical beam.
Figure 4:
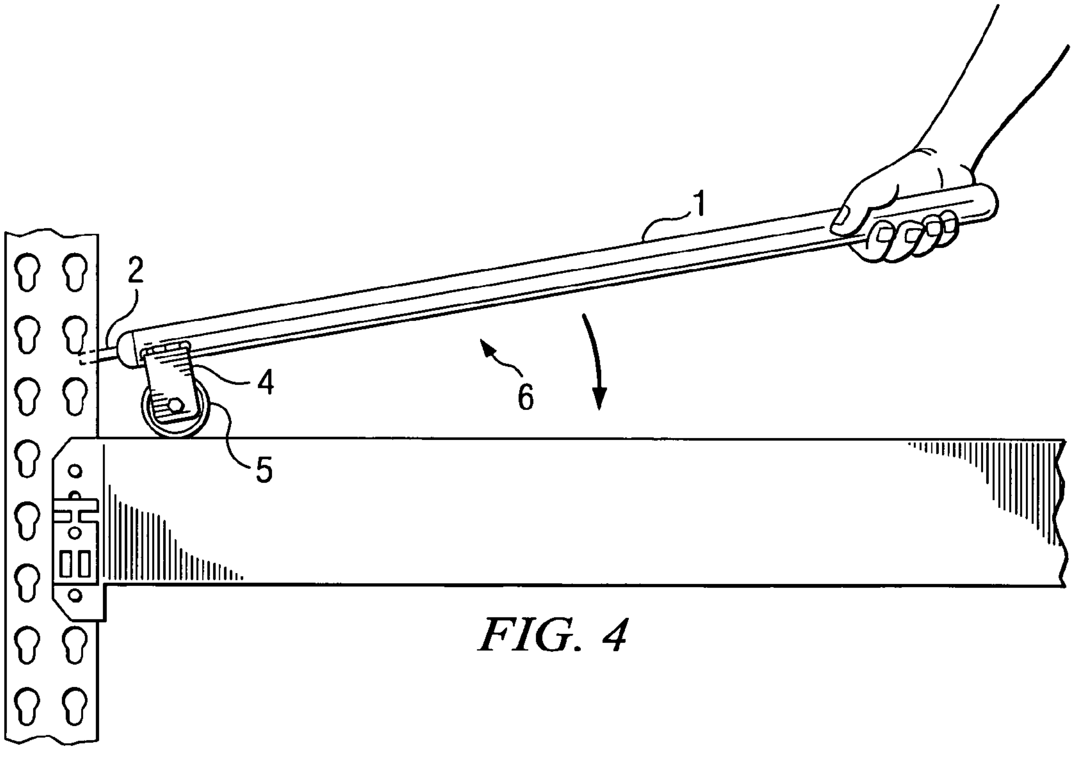
FIG. 4 Pg shows tool in position to set or install beam in vertical beam.

FIG. 1 is shown on Pg 1 of the Drawings.
FIG. 2 is shown on Pg 1 of the Drawings.
FIG. 3 is shown on Pg 2 of the Drawings.
FIG. 4 is shown on Pg 2 of the Drawings.

I claim:

1. A tool comprising an elongated handle with a first and second ends of an outer perimeter having a second elongated core within said elongated handle extending from said second end being less than said outer perimeter of said elongated handle; a leg support attached to said second end of said elongated handle and a wheel connected to said leg support.

2. The tool of claim 1 further comprising said elongated handle being cylindrical and said second elongated core being cylindrical including a v-cut.

3. The tool of claim 1 further comprising a bolt securing said wheel and serving as an axle.

4. The tool of claim 1 further comprising a first and second washer securing said cylindrical core inside of said elongated handle.

* * * * *